Oct. 1, 1929.                G. A. JOHNSON                1,730,214
              FRICTION SHOCK ABSORBING MECHANISM
                     Original Filed Oct. 25, 1923
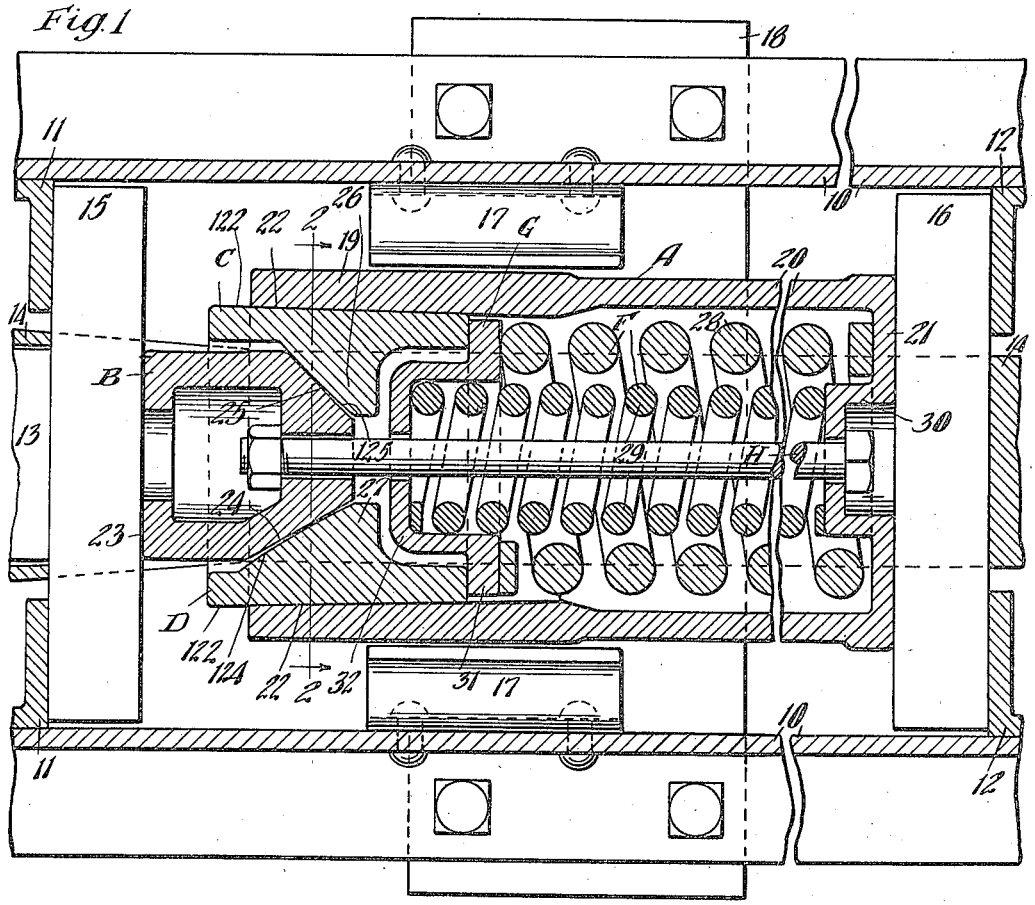
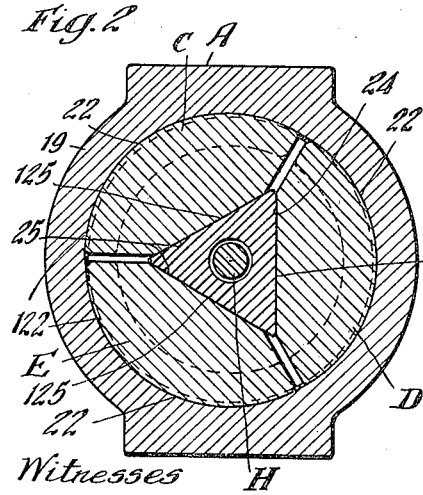
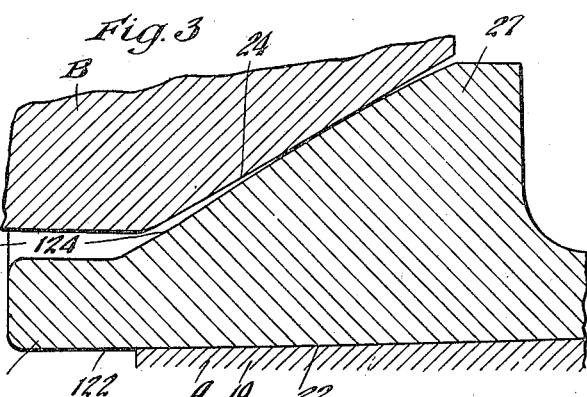
Inventor
George A. Johnson
George I. Haight
His Atty.

Patented Oct. 1, 1929

1,730,214

UNITED STATES PATENT OFFICE

GEORGE A. JOHNSON, OF CHICAGO, ILLINOIS, ASSIGNOR, BY MESNE ASSIGNMENTS, TO W. H. MINER, INC., A CORPORATION OF DELAWARE

FRICTION SHOCK-ABSORBING MECHANISM

Application filed October 25, 1923, Serial No. 670,657. Renewed March 30, 1928.

This invention relates to improvements in friction shock absorbing mechanisms, and process of fitting parts. More particularly the invention relates to such mechanisms wherein are employed a wedge friction system including a wedging means and a plurality of friction shoes coacting with a friction shell.

As is well known to those skilled in the art, in the manufacture of shock absorbing mechanisms for draft riggings, machine finishing operations are very seldom resorted to, on account of the increased expense which would be involved. In those shock absorbing mechanisms employing a friction shell, a plurality of friction shoes arranged in a circular series within the shell and a pressure-transmitting member, it is the usual practice to make the shell as a casting without any machine finishing operation, to make the pressure-transmitting wedge member as a casting, and to drop-forge the friction shoes, and in the case of the latter elements, satisfactorily accurate results can be obtained. In the case of the wedge-pressure transmitting member having flat or plain wedge faces, the faces can easily be ground to remove any slight irregularities arising from the casting operation. In the case of the interior of the cylinder, machining would be difficult and too expensive to receive practical consideration and consequently the accuracy of manufacture of the friction shell is dependent upon the molding and casting without other appreciable finishing. In foundry operations, certain working variations must be allowed for in commercial practice.

As is well known to those skilled in the art, in a friction device of the character indicated from the preceding, it is essential that true full contact be had on all cooperating friction surfaces and also on the wedge faces. Due to the necessary foundry variations which must be permitted in commercial practice, it has heretofore been found that proper contact of all the sets of surfaces just referred to cannot always positively be insured with the result that the devices do not function as efficiently as they should.

One object of my invention is to provide a very simple expedient, which does not involve any increased expense in cost of manufacture by which adjustments of the parts within the limits of variations necessitated by commercial manufacture, can be had to positively insure the proper contact of all the co-operating engaging sets of faces.

A more specific object of the invention is to provide, in that type of friction mechanism having a friction shell of generally cylindrical form, a circularly arranged series of friction shoes and a centrally disposed pressure-transmitting wedge, means for insuring flat surface contact between the pressure-transmitting wedge and the cooperating faces of the shoes while allowing for those variations in the friction surfaces of the shell which are necessitated by commercial practice.

Still another object of my invention is to provide a process or method by which the contacting faces of the pressure-transmitting wedge and the shoes of the mechanism, of the character indicated in the preceding paragraph, will be brought into true flat surface engagements with each other after a very few actuations after the parts have been assembled, whereby the permitted foundry variations in commercial practice will be automatically compensated for.

My invention furthermore consists in improvements in the parts and devices, the novel combinations of the parts and devices and the novel steps of the process as hereinafter shown, described and made the subject matter of the claims.

Other objects and advantages of the invention will more clearly appear from the description and claims hereinafter following.

In the drawing forming a part of this specification, Figure 1 is a longitudinal, sectional view of a portion of a railway draft rigging, the section through the shell and friction elements therewithin corresponding to two section planes at 120° apart. Figure 2 is a vertical, transverse, sectional view corresponding substantially to the line 2—2 of Figure 1. And Figure 3 is a longitudinal, sectional view, on an enlarged scale, of a wedge shoe and portions of the friction shell and main wedge.

In said drawing, 10—10 denote the usual draft or center sills of a car under-frame, said sills being preferably of channel cross section and to the inner faces of which are secured front stop lugs 11 and rear stop lugs 12, of usual construction. A portion of the drawbar is indicated at 13, the same having operatively associated therewith a hooded cast yoke 14 of well known form and within which is disposed the shock absorbing mechanism proper hereinafter described, a front main follower 15 and a rear main follower 16. The friction shock absorbing mechanism proper, illustrated in the drawing is of that type employing a substantially cylindrical shell and cage, and in order that it be maintained in proper central position, the draft sills 10 may have secured to the inner faces thereof guide plates 17—17. The yoke and parts contained therein are supported in operative position by a detachable saddle plate 18.

The improved shock absorbing mechanism proper, as shown, comprises a combined friction shell and spring cage casting A; a pressure transmitting wedge B; three friction shoes C, D and E; a spring resistance F; a spring follower or cap G; and a retainer bolt H.

The casting A is of generally cylindrical form having the friction shell proper 19 thereof open at the front end. The casting provides a cylindrical spring cage or casing 20, and at its rear end the casting A has an integral, transverse wall 21 bearing on the follower 16. The friction shell proper 19 is preferably of the following formation, as best illustrated in Figures 1 and 2. The interior of the shell 19, while of generally cylindrical contour, is preferably comprised of three, true, cylindrical surfaces 22—22, symmetrically arranged around the axis and of approximately 120° extent each. The cylindrical surfaces 22—22 are converged inwardly of the shell on a relatively slight taper and in such a manner that the inner ends of said three cylindrical surfaces merge into a true circle. With this arrangement, the friction shoes, which have true cylindrical surfaces as hereinafter described, will maintain true surface contact, as distinguished from line contact, with the shell at all positions during a compression stroke.

The wedge B, through which the pressure is transmitted, is in the form of a hollow casting having a front transverse bearing face 23 engaging the front follower 15. At its inner end, the wedge B is provided with a true wedge face 24 and two other rearwardly converging inclined faces 25—25, all of the faces 24 and 25 being disposed around the center or axis of the wedge, and giving to the wedge the appearance of a truncated, somewhat irregular triangular pyramid. It will be evident from the drawing that the three inclined faces 24 and 25 are so disposed that, a transverse section taken through the wedge B will intersect all three faces.

The two friction shoes C and E, preferably in the form of castings are or like construction, each having an outer friction surface 122 which corresponds to a portion of a true cylindrical surface and which extends through an arc of approximately 120°. On its inner side, that is, the side nearest the axis of the shell, each shoe C and E is provided with a lateral enlargement 26 on the front side of which is provided a rearwardly and inwardly inclined, longitudinally convex face 125 cooperating with one of the inclined faces 25 as clearly shown in Figures 1 and 2.

The third or remaining shoe D is provided with a similar outer cylindrical friction surface 122; and on its inner side with an inwardly projecting enlargement 27 having an inclined, longitudinally convex wedge face 124 coacting with the true wedge face 24 of the wedge B. The faces 125 and 124 of the shoes are so disposed that the front ends of the shoes will normally lie approximately flush with each other and project a short distance outside of the end of the shell. As clearly shown in Figure 3, the faces 124 and 125 of the wedge shoes are only slightly convex, being curved longitudinally on an arc of relatively great radius, for a purpose hereinafter described.

The spring resistance F, as shown, comprises an outer heavy coil 28 bearing at its inner end against the wall 21 of the casting A and an inner coil 29 bearing at its inner end upon a hollow cup-like boss 30 formed integral with the end wall 21.

The spring follower is more or less cup-shaped having a heavy annular flange 31 on the inner side of which is adapted to bear the front end of the outer coil 28. Said spring follower G has a forwardly extended integral cup section 32, the interior of which provides a bearing for the front end of the inner coil 29.

The retainer bolt H is anchored at its rear end within the boss 30 and at its forward end within a suitable recess provided within the wedge B, the latter and the spring follower G being suitably apertured to accommodate the shank of the bolt. Said bolt not only serves to maintain the parts assembled, but is also utilized to adjust the parts to proper overall length, to maintain them in this position when under full release; and to place the spring under initial compression to compensate for wear.

Assuming a buffing or compressing action applied to the draft rigging, the general operation of the mechanism is as follows, detailed consideration of the cooperating flat and convex inclined faces being omitted at this time. As the wedge B is forced inwardly of the shell, there will be initially a slight movement of the wedge B inwardly with respect to the keen angle shoes D due to the inertia of the shoes and the fact that on account of the relatively keen angle, slippage of the faces 24 and 124 is possible. During this initial action, the two blunt angle shoes C and E will move longitudinally inwardly of the shell substantially in unison with the wedge B on account of the blunt relatively non-wedging angle of the cooperating faces 25 and 125 thus advancing the shoes C and E longitudinally slightly ahead of the keen angle shoe D. The foregoing initial action sets up the desired pronounced spreading action. As the parts continue their movement inwardly of the shell, further slippage between the keen angle faces 24 and 124 is substantially nil but due to the taper of the shell surface, there must be a relative approach of the shoes which is permitted by the shoes C and E moving radially inward with respect to the wedge B, the slippage occurring on the blunt angle faces 25 and 125 which act as a sort of safety valve for this purpose. This differential action also advances the shoes C and E longitudinally ahead of the shoes D and the action so continues until the end of the compression stroke. During the compression stroke as above described and due to the advance of the shoes C and E relative to the shoe D, the spring cap or follower G will be displaced or removed from the inner end of the shoe D. In this connection, it is pointed out that the contact existing between the ends of the two blunt angle shoes C and E with a flange 31 of the cap G is approximately 240°, that is appreciably more than half of the circumference of the spring cap flange 31. With this arrangement, the two shoes C and E advancing together in unison, the spring cap G is maintained in its proper position, that is, at right angles to the axis of the mechanism and without the possibility of the spring cap being tilted by the pressure of the spring. While the spring cap G is out of engagement with the inner end of the keen angle shoe D during the compression stroke as above described, nevertheless it will be apparent that the shoe D always affords resistance because of the friction between the surface 122 thereof and the shell surface 22, this friction acting to retard the shoe D with gradually increasing force always during the compression stroke. The friction shell being of metal, preferably malleable iron, it is capable of a limited amount of radial expansion which takes place during the compression of the mechanism. With the degree of taper hereinbefore referred to, the expansion cannot neutralize the taper, therefore a differential action is assured.

Upon removal of the actuating or compressing force, there is an initial releasing action induced by the lateral inward contraction of the shell. These forces produce a relative approach toward the central line of the mechanism of the three shoes and this in turn causes the pressure transmitting wedge B to be squeezed out from between the shoes, said action being facilitated by reason of the blunt angle faces 25 and 125 on the wedge and blunt shoes respectively, it being noted that the faces 25 and 125 now act substantially as true wedge faces with respect to the radially inward contracting forces. The contraction of the shell continues until the shell has either resumed its normal condition or until the contracting forces have been reduced to a point where the stored up energy in the spring exceeds the longitudinal resistance to release the same. The initial action, just described, results in loosening the wedge B sufficiently to permit the reduction of pressure between the friction surfaces of the various shoes and the shell friction surfaces, whereupon the spring becomes effective to commence moving all of the friction elements outwardly of the shell. At the beginning of the outward movement just referred to, the spring cap or follower G will obviously move the two blunt angle shoes C and E in an outward direction, which in turn picks up the wedge B sufficiently to loosen the keen angle wedge faces 124 and 24 so that immediately thereafter the flange of the spring follower or cap G will pick up the inner end of the keen angle shoe D and also move it longitudinally. The outward movement referred to continues until the wedge B is limited against further movement by the bolt H. The three shoes will then be forced to their normal position and on account of the extended area of contact between the two blunt angle shoes and the spring follower, which maintains the latter perpendicular to the axis, all three shoes will be brought to rest with their inner ends flush as shown in Figure 1.

Referring now more specifically to the operation and functioning of the flat and convexed surfaces of the pressure-transmitting wedge and shoes. In commercial practice, a variation of two degrees in the taper of the shell friction surfaces in a device of the kind disclosed is permitted. In carrying out my invention, the radius of curvature of the convexed surface 124 is made relatively long and of such a length that it will accommodate variations within the two degrees above referred to, that is, assuming the maximum variation in one direction, contact will be insured between the curved surface 124 and the flat surface 24 near the inner ends thereof; assuming the limit of variation in the opposite direction, contact will be assured between the curved surface 124 and flat surface 24 near their outer ends; a shell formed with the friction surfaces tapered accurately as designed will insure contact at the centers of the curved surface 124 and flat surface 24; and variations intermediate the points referred to will insure contact between the extreme limits mentioned. When the parts are assembled, there will be theoretically only a line contact between each set of surfaces 124 and 24 but as soon as the device is compressed once, this theoretical line of contact will immediately be widened into a surface contact of appreciable width and as two or three or four additional compressions of the mechanism occur, the area of contact is correspondingly increased or widened until a sufficiently big enough area is obtained to insure the proper functioning of the parts. This process of fitting of the parts to compensate for the permissible foundry variations can obviously be accomplished in the usual test of the gear before being shipped and applied to the car. From the foregoing, it will be observed that my improvements permit of automatic compensation of the parts even though the variation in inclination of one shell friction surface 22 may differ from the variation found in any other friction surface 22. It will also be obvious that no increase in the cost of manufacture of any of the parts, as compared with a device of similar type, is involved, and actual practice has demonstrated that the parts will automatically adjust themselves and produce the desired results as above indicated.

While I have herein shown and described the convex surfaces as being provided on the friction shoes, it will be obvious that similar results can be obtained by placing the convex surfaces on the pressure-transmitting wedge and leaving the inclined faces of the shoes flat. Furthermore, the invention is capable of utilization of friction mechanisms of other types than that herein specifically described.

While I have herein shown and described my improvements as employed with a casting of substantially cylindrical form throughout, nevertheless it will be appreciated by those skilled in the art that the invention may be embodied in gears of other types and also that various changes and modifications may be made in certain details of construction without in any way departing from the spirit of the invention. All such changes, modifications and variations are contemplated which come within the scope of the claims appended hereto.

I claim:

1. In a friction shock absorbing mechanism, the combination with a friction shell having interior, longitudinally extending inwardly converging friction surfaces; of a spring resistance; a friction shoe cooperable with the friction surface of said shell, said shoe having, on its inner side, a face inclined inwardly and toward the center of the shell; and a member through which the actuating pressure is transmitted to said shoe and having a corresponding contacting face, one of said contacting faces being slightly convex, the curvature of said convex face being relatively small, whereby when the parts are initially assembled contact of relatively minute area is had between said faces to compensate for variations within predetermined limits, said convex face being flattened automatically upon actuations of the mechanism to thereby increase the area of contact of said surfaces and produce true contact therebetween.

2. The herein described process of insuring proper fitting of the parts of a friction mechanism which includes a member having slightly converging friction surfaces, friction shoe elements cooperable therewith, and an element through which the actuating pressure is transmitted to the shoes, which includes: manufacturing said member and elements independent of each other and providing on one of said elements an engaging surface slightly elevated at its central portion with respect to portions on opposite sides thereof; assembling said member and elements with the remaining parts of the mechanism and with said elevated portion in contact with the other element; and then compressing the mechanism a number of times thereby compressing said elements and effecting relative movement thereof to flatten out said elevated portion to provide a wider area of contact with the cooperating contacting element.

3. The herein described process, insuring the accurate fitting of the parts of a friction shock absorbing mechanism comprising a friction shell having interior, inwardly converged friction surfaces; a spring resistance; a plurality of friction shoes cooperable with said surfaces and a pressure-transmitting wedge having contact with said shoes which includes: independently manufacturing said shell, spring resistance, shoes and wedge and initially providing one of each of the contacting sets of friction surfaces of the shoes and wedge with a convex contour, said surfaces of convex contour being of relatively small curvature; assembling the parts; and then successively compressing the mechanism to effect relative movement of said shoes and wedge to flatten down said convex surfaces to provide enlarged flat contacting areas between the shoes and wedge.

4. The herein described process of insuring proper fitting of the parts of a friction shock absorbing mechanism, including the following steps: forming a friction member having a friction surface; forming a friction shoe element adapted to co-operate therewith; forming an element through which the actuating pressure is transmitted to the shoe; providing on one of said elements an engaging surface having an elevated portion; assembling said member and elements with the remaining parts of the mechanism and with said elevated portion in contact with the other element; and then compressing the mechanism a number of times to flatten out said elevated portion to provide a wider area of contact with the co-operating contacting element.

5. The herein described process of insuring the accurate fitting of the parts of a friction shock absorbing mechanism and comprising the following steps: forming a friction shell with interior friction surfaces; forming a plurality of friction shoes with friction surfaces and wedge faces, the friction surfaces thereof being adapted to co-operate with said shell surfaces; forming a pressure-transmitting wedge with faces adapted to contact with said shoe faces; providing one of each of the co-acting sets of faces of the shoes and wedge with a protruding portion; assembling the parts; and then successively compressing the mechanism to flatten down said protruding portion to increase the area of surface contact of said last-named faces.

In witness that I claim the foregoing I have hereunto subscribed my name this 19th day of October, 1923.

GEORGE A. JOHNSON.